United States Patent Office 3,453,945
Patented July 8, 1969

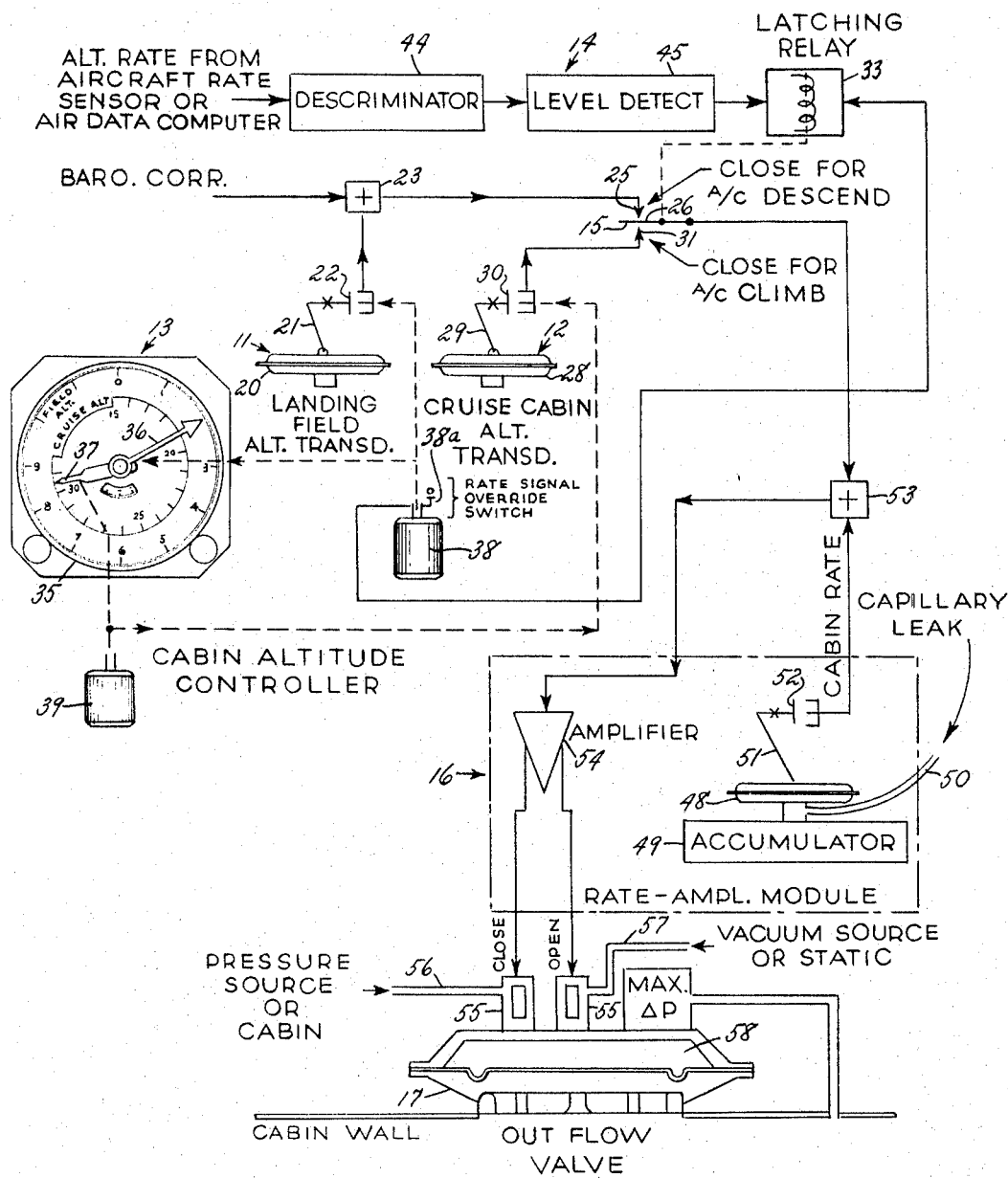

3,453,945
PREPROGRAMMED CABIN PRESSURIZATION SYSTEM
John H. Andresen, Jr., Hewitt, N.J., assignor to Intercontinental Dynamics Corporation, Englewood, N.J., a corporation of New Jersey
Filed Oct. 10, 1967, Ser. No. 674,162
Int. Cl. B64d 13/04
U.S. Cl. 98—1.5
2 Claims

ABSTRACT OF THE DISCLOSURE

A preprogrammed cabin pressurization system including two cabin altitude reference transducers, each manually adjustable to a selected cabin altitude, means receiving an aircraft rate of climb or descent signal above a predetermined level, and maintained for a predetermined period, and employing said signal to interconnect one of said reference cabin altitude transducers in some summing relation with respect to a cabin altitude rate transducer, the summed output being employed to control the condition of a valve venting the aircraft cabin to static pressure.

---

This invention relates generally to the field of aircraft pressurization control, and more particularly to an improved system whereby upon the manual preselection of a cruising altitude, and the altitude of a field at which a subsequent landing will be made, the change in internal cabin pressure from that at ground level to that maintained at the preselected altitude is automatically accomplished at a predetermined rate. Similarly, upon descent to the selected landing field, cabin pressure is automatically increased to that encoutered at the landing field at a similar predetermined rate.

It is among the principal objects of the present invention to provide an improved preprogrammed cabin pressurization system, in which all adjustments thereto may be completed, for an individual flight, prior to take off, while permitting subsequent adjustment of a flight plan is changed without difficulty.

Another object of the invention lies in the provision of an improved preprogrammed cabin pressurization system which will continuously function in an automatic manner according to a preestablished program during the course of an entire flight.

A further object of the invention lies in the provision of a programmed cabin pressurization system possessed of the above advantages, which may employ individual components known and existing in the art, whereby the installation and servicing of the same is facilitated.

These objects and features, as well as other incidental ends and advantages, will more fully appear in the progress of the following disclosure, and be pointed out in the appended claims.

In the drawing, to which reference will be made in the specification, the single figure is a schematic block diagram of an embodiment of the invention.

In accordance with the invention, the disclosed embodiment comprises broadly: first and second reference altitude transducers 11 and 12, respectively, altitude setting means 13, aircraft altitude rate sensing means 14, reference selecting means 15, cabin altitude rate sensing means 16, and an outflow valve element 17.

The first reference altitude transducer 11 is employed for preselecting cabin pressure corresponding to that existing at ground level at the landing airport. It includes an aneroid element 20, connected through linkage means 21 to an E–I pickoff 22, the output of which is summed at 23 with a barometric correction signal, either manually inserted, or from another source within the aircraft. This signal is transmitted to a first terminal 25 of a double throw switch 26 which forms a part of the reference selecting means 15.

The second reference altitude transducer 12 is generally similar, including an aneroid element 28, linkage means 29, and an E–I pickoff 30, the output of which is conducted to a second terminal 31 of the switch 26. The switch blade is operated by solenoid relay 33, to close, in selective manner a circuit between the terminal 25 or the terminal 31.

The altitude setting means 13 preferably includes a dual dial 35, the face of which cooperates with first and second pointers 36 and 37, respectively, the outer scale cooperates with pointer 36 and reads in terms of cabin altitude which should be equal to field altitude at landing. The inner scale reads in terms of cruise altitude. It is so calibrated as to set transducer 12 to a cabin altitude slightly higher than that which causes maximum allowable cabin differential when the aircraft is at the cruise altitude selected. Control knobs 38 and 39 are connected to the pointers 36 and 37, respectively, and also adjust the position of the E–I pickoffs 22 and 30 to correspond to selected altitude references.

The altitude rate receiving means 14 includes a source of the rate signal, obtained either from a rate of climb sensor, an air data computer, or a servoed altimeter, of types well known in the art. The rate signal is passed through a discriminator 44 to a level detector 45 which includes timing means of capacitor of other type, the output of which operates the relay 33 in either of two directions, depending upon the polarity of the received signal. A momentary push switch 38a in knob 38 will actuate a switch to connect terminal 31.

The cabin altitude rate means 16 includes a diaphragm capsule element 48 including an accumulator 49 and cooperating capillary leak 50, and is interconnected by linkage means 51 to an E–I pickoff 52. The output of the pickoff 52 is summed at point 53 to an amplifier 54, the output of which operates one or more solenoid valves 55 which served to interconnect the outflow valve element 17 with a source of pressure 56, or a source of vacuum or static pressure 57 which is vented to the reference chamber 58 thereof. The valve element 17 may be of any suitable type, as for example that disclosed in my prior Patent No. 3,272,608, granted Sept. 13, 1966, and assigned to the same assignee as the instant application or may be a motorized butterfly valve driven from the amplifier 54.

OPERATION

The above disclosed system requires only that the pilot set his intended cruise altitude using control knob 38, and the altitude of the field upon which he will be landing using the control knob 39. All pressurization functions are done automatically thereafter to the completion of an individual flight. The pilot may elect to change either cruise or landing altitude settings at any time during flight without causing any transient sharp pressure changes within the cabin.

During take off, the cabin altitude rate means 16 holds the cabin pressure constant as its function is to bring the cabin pressure to that corresponding to the altitude set by knob 28. After take off, as the aircraft climbs for a period of 30 seconds or more at a rate of at least 600 feet per minute, the altitude rate signal switches control to the cruise altitude transducer 12, by operation of relay 33 and the cabin pressure increases toward its predetermined cruise value as set by knob 39. If the aircraft, after a climb, levels off to anywhere within plus or minus 600 feet per minute altitude rate, the cabin control will remain on the cruise transducer since the altitude rate change is not sufficient to pass the level detector 45 and operate the relay 33. As the aircraft approaches destination, and makes its descent at a rate over 600 feet per minute for more than a period of 15 seconds, the altitude rate changing sufficiently to pass the level detector 45 and operate the relay 33 the cabin control switches to the landing field cabin altitude transducer 11, and cabin pressure increases to field altitude.

Should the aircraft descend to a lower level, but not go to the landing field altitude, the pilot resets the cruise pointer and pushes the cruise button on arriving at the lower altitude. This keeps the control on cruise instead of switching it to landing condition. At all times, the cabin altitude rate is limited to plus or minus 400 feet per minute by the cabin altitude rate transducer, irrespective of the rate of climb of the aircraft. Only if the maximum change in pressure is exceeded, or a negative change in pressure occurs will the cabin rate exceed 400 feet per minute.

If desired, altimeter setting may be introduced automatically, using an AC phase reversing signal from the barometric setting system of the aircraft altimeter, as is known in the art. Optionally, where this potentiometer means is not available, the barometric setting may be made manually on the cabin altitude controller by pulling out a knob and rotating the dial and pointer together with reference to a barometric scale in a window in the dial (not shown). This adjustment will not disturb a previously set landing field altitude.

Another option (not shown) is to include a landing gear switch which will preempt both altitude controllers and call for the control valve to open at a speed which is controlled by rate sensor 16 at 400 feet per minute.

I claim:
1. In an aircraft cabin pressurization system, including a control valve selectively establishing communication between the interior and exterior of said cabin, and means controlling operation of said valve, the improvement comprising: first and second reference cabin altitude transducers, manual means for selectively adjusting a reference point on each of said transducers, means for receiving an aircraft altitude rate signal above a predetermined level of given polarity, timing means detecting the presence of a signal above said predetermined level for a preselected time interval, latching relay means actuated by a rate signal of sufficient amplitude and period selectively interconnecting one of said reference altitude transducers, depending upon the polarity of said signal; a cabin rate transducer, means summing the output of said cabin rate transducer with the output of a selected reference altitude transducer, amplifier means receiving a summed output and controlling operation of said control valve.

2. Structure in accordance with claim 1 including a push button switch connected to said latching relay means to return control to the cruise cabin altitude controller after a descent thus countermanding the aircraft altitude rate signal.

References Cited
UNITED STATES PATENTS

| | | | |
|---|---|---|---|
| 3,053,162 | 9/1962 | Andresen | 98—1.5 |
| 3,141,399 | 7/1964 | Andresen | 98—1.5 |
| 3,376,803 | 4/1968 | Emmons | 98—1.5 |

MEYER PERLIN, *Primary Examiner.*